(No Model.)
W. S. FRAZIER.
SULKY.
No. 245,367. Patented Aug. 9, 1881.
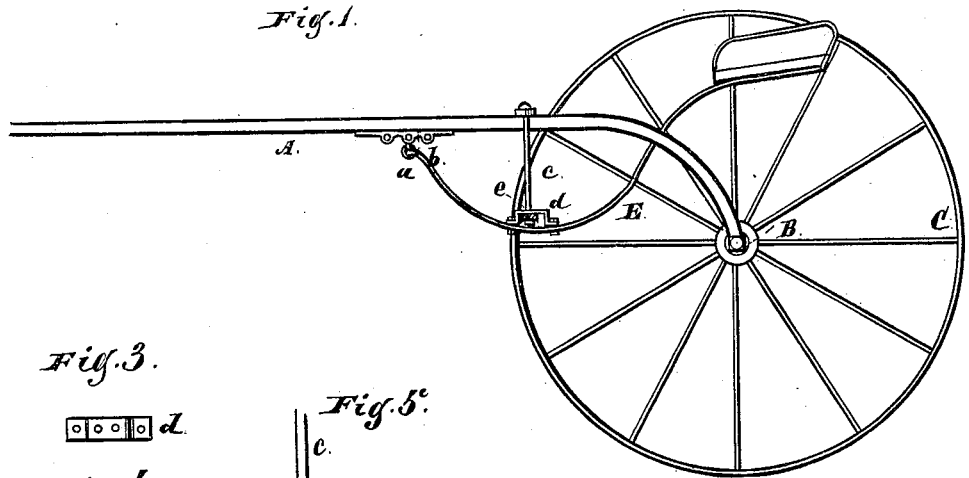
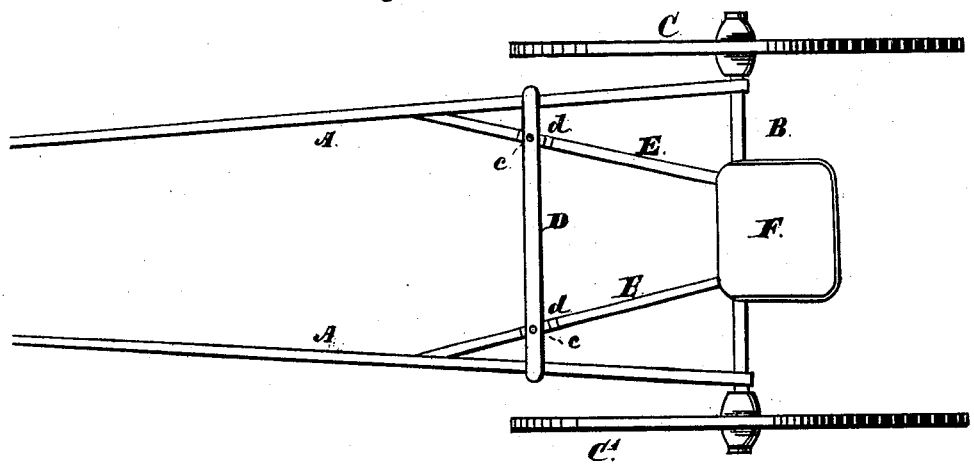
Witnesses:
B. A. Price
A. H. Adams
Inventor:
Walter S Frazier
By West & Bond
attys

UNITED STATES PATENT OFFICE.

WALTER S. FRAZIER, OF AURORA, ILLINOIS.

SULKY.

SPECIFICATION forming part of Letters Patent No. 245,367, dated August 9, 1881.

Application filed May 19, 1881. (No model.)

*To all whom it may concern:*

Be it known that I, WALTER S. FRAZIER, residing at Aurora, in the county of Kane and State of Illinois, and a citizen of the United States, have invented a new and useful Improvement in Sulkies or Two-Wheeled Vehicles, of which the following is a full description, reference being had to the accompanying drawings, in which—

Figure 1 is a side elevation with the wheel C' removed; Fig. 2, a top or plan view; Figs. 3, 4, and 5, details, Fig. 5 being enlarged.

My improvements relate to sulkies or two-wheeled vehicles, and have for their object the cheapening and simplifying of their construction, and the arrangement of the seat and its supports so that the seat can be mounted from behind the axle without having to step over elevated seat-supports; and its nature consists in supporting the seat from the shafts entirely by the curved bars which form the curved foot rest or support, and in the combination of the parts, as hereinafter more fully set forth and claimed.

In the drawings, A indicates the shafts; B, the axle; C C', the wheels; D, the cross-bar of the shafts; E, the foot-rest and seat-supports; F, the seat; $a$, the front hinge or hinges; $b$, a plate by which the hinges are attached to the shafts; $c$, supporting rod or rods; $d$, a spring stirrup or casing; $e$, spring, and $f$ nut.

The form of shafts shown and the wheels and axle are well known and in common use, and as most, if not all, of the common forms, when the shafts are curved upward from the axle and are attached thereto, can be used, they are not specially described.

The seat-bars E are curved, as shown, or otherwise formed to give the seat a sufficient support and elevation, and the support for the feet at a lower position than the seat, and by the same bars. These bars E may be made of metal or wood, or both, and may each be made of more than one piece. Said bars are attached to the shafts at $a$ by any suitable means. In the form shown the hinge $a$ is adjustable along the plate $b$, and the rod $c$ is adjustable along the stirrup or case $d$ by the holes shown; but these adjustments are not essential parts of my improvements.

For the support of the curved or bent bars E, I attach rods or straps $c$ to the cross-bar D, or to suitable clips or brackets on the shafts. These rods, or their equivalent suspending device, are of the right length to bring the seat into proper position, and in the form shown I pass them through the cases $d$, and through a rubber or other suitable spring, $e$, as shown at Fig. 5, and secure such spring in place by a nut, $f$, or nut and washer-plate. As shown, the cases $d$ are attached to the upper sides of the bars E; but it is evident that the rods $c$ may be made to pass through the bars E, and dispense with their cases, and that with different forms or kinds of springs they may be placed at the sides of the bars or under them, a good form being to use one or more flat steel springs running across the foot-rest. Suitable spring device may be attached above, below, or on the side of the cross-bar or to the shafts.

The bars E have sufficient strength to support the seat and its occupant without any addition, and without the seat rails, bars, or supports heretofore used in addition to the rails supporting the device, floor, or platform for sustaining or resting the feet; and by my improved construction I avoid the use of such seat-supporting bars or rails, and thereby have a free space left for mounting the seat without climbing over separate seat bars or rails. It is evident, however, that the rails E may be braced across parts of the curve or the bends, especially if made of more than one piece, without departing from the principles of my improved construction and invention; and it is also evident that the rods $c$ need not be vertical, as their lower ends may be considerably farther back than their upper ends, and that the hinge or flexible connection may be at the lower end of the rods $c$ and the spring located at $a$, and that in the form shown one central spring-rod may be used in place of the two at the sides.

Sulkies have been heretofore made with seats and foot-rests supported from the shafts, and are shown in Patents Nos. 233,744 and 233,745, heretofore granted to me, both dated October 26, 1880; but such constructions have separate seat-bars and foot-rest-supporting bars while by my present improvement one set of bars is made to perform the service of both sets of the older construction.

What I claim as new, and desire to secure by Letters Patent, is as follows:

1. The seat and platform supporting-bars E, in combination with the shafts A and rods c, substantially as described, whereby separate seat-supporting bars or rails are dispensed with and an improved space for mounting the seat is provided, substantially as set forth.

2. The combination of the seat and platform supporting-bars E, shafts A, and rods c with the springs e and a hinged or flexible connection, a, substantially as specified.

WALTER S. FRAZIER.

Witnesses:
J. A. LANGWORTHEY,
E. S. FRAZIER.